(12) United States Patent
Wilfong

(10) Patent No.: US 6,352,645 B1
(45) Date of Patent: Mar. 5, 2002

(54) LIQUID-TANK DEBRIS EXTRACTION SYSTEM AND METHOD OF OPERATION THEREOF

(75) Inventor: Troy Arnett Wilfong, Goodyear, AZ (US)

(73) Assignee: Arizona Public Service Company, Phoenix, AZ (US)

( * ) Notice: Subject to any disclaimer, the term of this patent is extended or adjusted under 35 U.S.C. 154(b) by 0 days.

(21) Appl. No.: 09/618,155

(22) Filed: Jul. 17, 2000

(51) Int. Cl.$^7$ ................................................ B01D 37/00
(52) U.S. Cl. ........................ 210/767; 210/238; 210/241; 210/411; 210/416.1; 210/739; 210/791; 15/1.7; 376/313
(58) Field of Search ................................. 210/107, 108, 210/143, 169, 257.1, 258, 406, 411, 416.1, 416.2, 767, 791, 739, 241, 237, 238; 15/1.7, 321; 376/310, 313, 316; 134/167 C (56) References Cited

U.S. PATENT DOCUMENTS

| | | | |
|---|---|---|---|
| 2,046,770 A | * 7/1936 | Coberly et al. | 210/411 |
| 2,725,356 A | 11/1955 | Lombardi | |
| 3,039,122 A | 6/1962 | Birdsall | 15/1.7 |
| 3,061,100 A | * 10/1962 | Fehlmann | |
| 3,063,077 A | 11/1962 | Pansini | 15/1.7 |
| 3,220,553 A | * 11/1965 | Growall et al. | |
| 3,755,843 A | 9/1973 | Goertzen, III et al. | 15/1.7 |
| 3,868,739 A | 3/1975 | Hargrave | 15/1.7 |
| 3,886,616 A | 6/1975 | Hayes | 15/1.7 |
| 3,891,233 A | 6/1975 | Gischel | 210/237 |
| 3,939,899 A | 2/1976 | Henkin et al. | 15/1.7 |
| 3,961,393 A | 6/1976 | Pansini | 15/1.7 |
| 4,061,480 A | 12/1977 | Frye et al. | 55/356 |
| 4,154,680 A | 5/1979 | Sommer | 210/169 |
| 4,235,569 A | 11/1980 | Wegner et al. | 415/122 |
| 4,240,173 A | 12/1980 | Sherrill | 15/1.7 |
| 4,304,022 A | 12/1981 | Sommer | 15/1.7 |
| 4,374,024 A | 2/1983 | Peloquin et al. | 210/241 |
| 4,828,691 A | * 5/1989 | Abbott et al. | 210/237 |
| 4,959,146 A | * 9/1990 | Kristan | 210/237 |
| 4,962,559 A | 10/1990 | Schuman | 15/1.7 |
| 5,095,571 A | 3/1992 | Sargent | 15/1.7 |

* cited by examiner

*Primary Examiner*—Joseph W. Drodge
(74) *Attorney, Agent, or Firm*—Lowell W. Gresham; Jordan M Meschkow; Meschkow &Gresham, P.L.C.

(57) ABSTRACT

A system (20) is presented for extraction of debris (22) from a tank (24) of potentially radioactive water (26) in a nuclear-powered energy-generation facility. The system (20) utilizes a subaqueous reversible motor (28), a subaqueous pump (30) magnetically coupled to the motor (28), and a subaqueous filter housing (50) removably coupled to the pump (30). A filter (52) having a metallic filter element (56) is incorporated into the filter housing (50). A control unit (34) is electrically coupled to the motor (28) and determines a rotational direction thereof from outside the tank (24). When the motor (28) is run in a forward rotational direction, the pump (30) produces a forward flow (36') of water (26), substantially all of which passes through the filter (52) so that debris (22) in the water (26) is entrapped in the filter (52). When the motor (28) is run in a reverse rotational direction, the pump (30) produces a reverse flow (36") of water (26), which extracts entrapped debris (22) from the filter (52).

41 Claims, 7 Drawing Sheets

LIQUID-TANK DEBRIS EXTRACTION SYSTEM AND METHOD OF OPERATION THEREOF

TECHNICAL FIELD OF THE INVENTION

The present invention relates to the field of debris extraction. More specifically, the present invention relates to the field of debris extraction from liquid.

BACKGROUND OF THE INVENTION

In nuclear-powered energy-generation facilities, there is a need to remove debris and foreign objects from tanks of potentially radioactive water.

During reactor plant operation, activated corrosion products along with fission fragments are released into the reactor coolant system. These are the sources of highly radioactive particles encountered during refueling operations. In the case of fuel failure, portions of fuel cladding and structural materials may also be encountered. Fuel-element cladding is subjected to varying amounts of heat, which heat brings about various chemical changes in the cladding. Since the water usually contains iron ions leeched from structural members, these changes typically involve the conversion of the cladding into oxides and/or ferroalloys of the cladding material, (e.g., zirconium oxide and/or various zirconium ferroalloys if the cladding is zirconium).

Such oxides and ferroalloys are often significantly softer than the original cladding material. This softer material tends to flake or slough off, resulting in debris within the containment tank. This irradiated or "hot" debris requires removal on a regular basis, typically during refueling. Since each particle of this debris may be so small as to border on the limits of visibility, especially underwater, this debris may be considered as composed of miniscule or "micro" objects.

In extreme cases, the debris may contain fragments of fuel and/or fuel byproducts (i.e., uranium, plutonium, and/or their oxides). Such debris is considered extremely hot and/or toxic, and must be removed with the utmost care. Since such fragments, too, are micro objects, the interests of safety assert that the entirety of the micro-object debris is considered to be of such objects whenever any of the debris may be so considered. This increases significantly the care exercised during the debris-removal procedure.

Additionally, a large (i.e., "macro") object may occasionally be discovered in the containment tank. Such macro objects may be objects dropped into the tank by personnel (e.g., a coin or ring), may be a part of the facility itself (e.g., a fastener), or other foreign materials. Any such macro object is typically retrieved from the tank and identified.

A partially subaqueous vacuum cleaner is the prior-art instrument of choice to effect removal of micro objects. Such a partially subaqueous vacuum cleaner typically utilizes a heavy, non-submersible motor and pump. A long hose connects a cleaning head with the pump. Such long hoses tend to collect debris. With potentially radioactive debris, there exists a very real problem of the hose itself becoming radioactive.

Because of size, shape, and/or mass, however, macro-object debris may often be beyond the retrieval abilities of a typical subaqueous vacuum cleaner, due in part to the strength of the flow as hampered by a long hose, etc. For example, a vacuum cleaner may require more than available power to retrieve a flat object, such as a dime, as such an object may be pressure-bound to the tank bottom by the very water flow generated by the vacuum. Thus, an alternative apparatus, such as a grabber, may be required to retrieve some macro objects.

An additional problem arises in that such macro objects are desirably inspected after retrieval. Indeed, such an inspection may be required by established safety procedures. A typical prior-art vacuum cleaner uses a relatively large fiberglass filter. The contents of such a filter (i.e., the debris entrapped within the filter by the cleaning operation) are not readily examined. Indeed, were a foreign macro object to be entrapped in such a filter, the filter would be removed from the tank, taken to a safe inspection area, and cut open to reveal the foreign object. Therefore, the use an alternative retrieval apparatus (e.g., a grabber) for macro-object debris becomes an effective requirement.

Even for micro-object debris, cleaning is not completely straightforward. Unlike a swimming-pool structure, a containment tank has many angles, corners, alcoves, canals, wells, and other structures and certified spaces that must be navigated during the cleaning process. This severely limits the size and shape of the actual cleaning portions of a subaqueous cleaning apparatus. Additional difficulties are encountered when a typical hose-connected cleaning head must be maneuvered around and through these structures.

Another problem arises in that the containment tank is deep, especially in comparison to a swimming pool. Therefore, whatever type of vacuum is used is desirably able to be both operated and controlled while at an appropriate depth by an operator outside the tank. A common device to effect such control is a long pole. However, a trailing hose containing moving water provides a continuous opposition to easy control, especially when connected to the pole at a considerable distance from the operator.

The debris collected by a subaqueous vacuum is potentially radioactive, often much more radioactive than the water in which it is immersed. A problem arises in removal of such debris. Conventionally, such debris is collected in a filter, typically of fiberglass. This contaminated filter must then be removed from the containment tank. In current practices, such a filter is disconnected from the rest of the vacuum and encased in a shielded cask while under water. The cask is then removed from the water and moved to a disposal area. The problem arises in that, since the cask contains radioactive debris, it must be heavily shielded. Such a cask is exceedingly heavy and requires the use of an overhead crane. This poses health and safety risks to the personnel involved in the filter removal operation.

Another factor in all aspects of the debris removal process is time. The containment tank is typically cleaned while the reactor is off-line. Since the cost of the reactor being off-line may be several tens of thousands of dollars per hour, the cleaning process is preferably only a small portion of the refueling process. To wit, the reactor is placed off-line, the core is defueled, the tank and all components are cleaned, the core is refueled, and the reactor is placed on-line. As the defueling and refueling processes are substantially fixed in time, it is most desirable that the cleaning process be accomplished as quickly as possible.

Many structures other than a containment tank require cleaning. A significant number of these structures may be cleaned while the reactor is on-line. Being on-line does not, however, eliminate the need for a timely, efficient, and safe cleaning operation.

With a conventional, fiberglass-filter vacuum-cleaning system, a considerable period of time is consumed introducing the system to the tank, and an even greater period of time is consumed extracting first the filter, then the system from the tank. This set-up and break-down time is in addition to any time spent actually cleaning the tank.

The present discussion is primarily concerned with the problems encountered cleaning a tank of potentially radioactive water in a nuclear-powered energy-generation facility. Those skilled in the art will appreciate that a similar discussion may be made about the cleaning of tanks or pools of other types of liquids in other type of facilities whenever the liquid is contained in confined or intricate spaces and/or hazardous to humans upon contact.

SUMMARY OF THE INVENTION

Accordingly, it is an advantage of the present invention that a liquid-tank debris-extraction system and method of operation thereof is provided.

It is another advantage of the present invention that a submersible, self-contained vacuum unit is provided that may be used to clean debris from a tank of liquid.

It is another advantage of the present invention that a submersible vacuum unit is provided having a detachably coupled filtration unit where the filtration unit may be detached while under water.

It is another advantage of the present invention that a submersible vacuum unit is provided wherein a reverse flow of liquid extracts debris entrapped in a filtration unit.

The above and other advantages of the present invention are carried out in one form by a system for the extraction of debris from a tank of liquid. The system has a vacuum unit configured to be completely submersible in the liquid and containing a reversible motor, a pump coupled to the motor and a filtration unit removably coupled to the pump and incorporating a filter configured to entrap the debris. The system also has a control unit electrically coupled to the motor and configured to determine a rotational direction of the motor from outside the tank. The pump passes a portion of the liquid through the filtration unit as a forward flow when the control unit causes the motor to operate in a forward rotational direction. The pump passes a portion of the liquid through the filtration unit as a reverse flow when the control unit causes the motor to operate in a reverse rotational direction.

The above and other advantages of the present invention are carried out in another form by a method of extracting an object of debris from a tank of potentially radioactive water in a nuclear-powered energy-generation facility. A reversible motor, a pump coupled to the motor, and a filter housing removably coupled to the pump are immersed into the tank. A filter is incorporated within the filter housing, the motor and pump are driven in one of a forward and a reverse rotational direction via a control unit outside of the tank. One of a forward and a reverse flow of water, respectively, is passed through the pump, the filter housing, and the filter.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

This discussion deals primarily with a system for extraction of debris from a tank of potentially radioactive water in a nuclear-powered energy-generation facility. Those skilled in the art will appreciate, however, that the system may also be applied to the extraction of debris from tanks or pools of other liquids hazardous to humans in other types of facilities. The use of the system with other liquids does not depart from the spirit or intended use of the present invention. Because of this, the various hazardous liquids with which this system may be used may be taken as being equivalent to "water" throughout this discussion.

Figure 1:
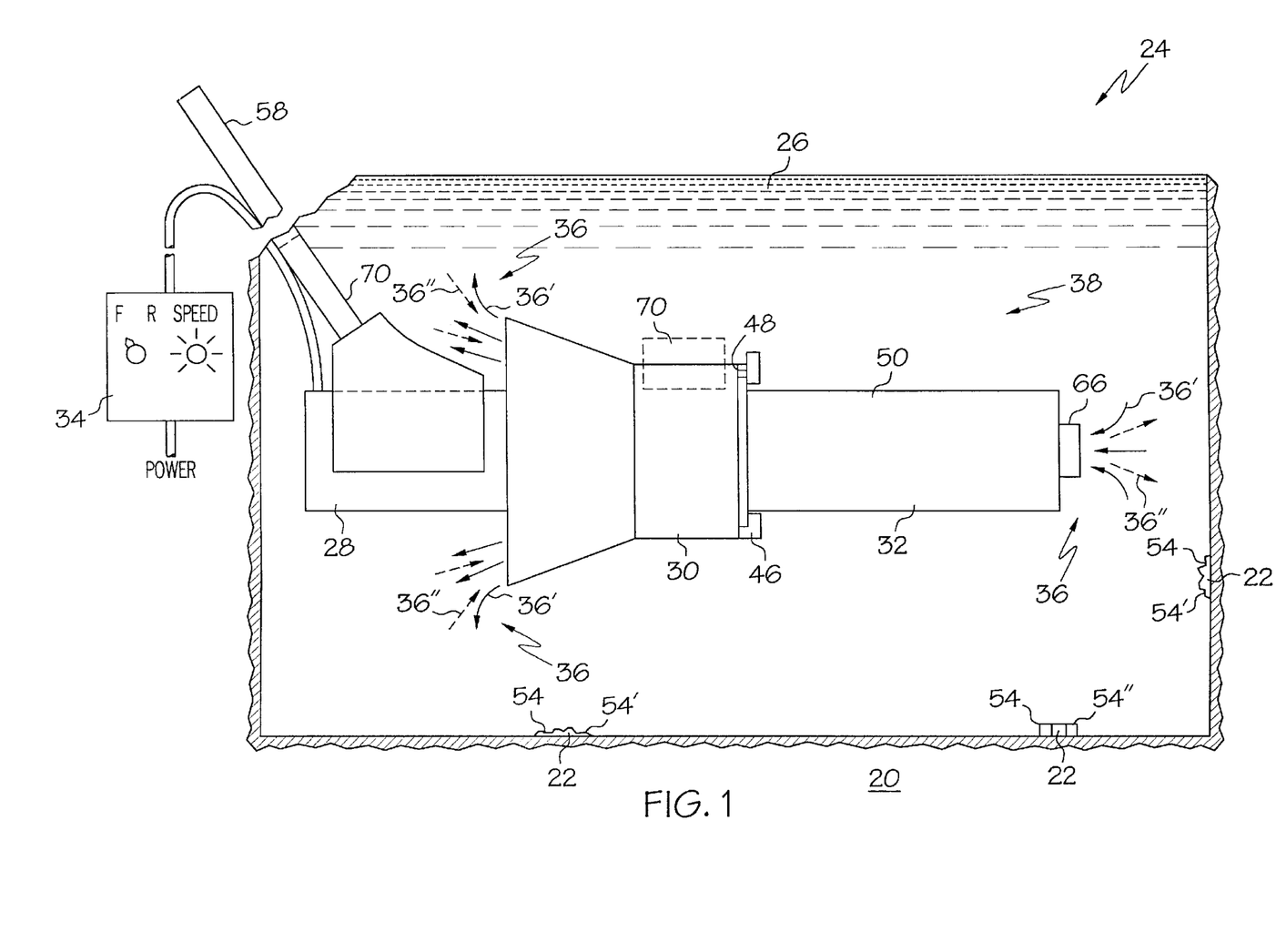
FIG. 1 schematically depicts a side view of a system for extraction of debris from a tank of potentially radioactive water in a nuclear-powered energy-generation facility and demonstrating the coupling of a motor, a pump, a filtration unit, and a control unit thereof in accordance with a preferred embodiment of the present invention.
Figure 2:
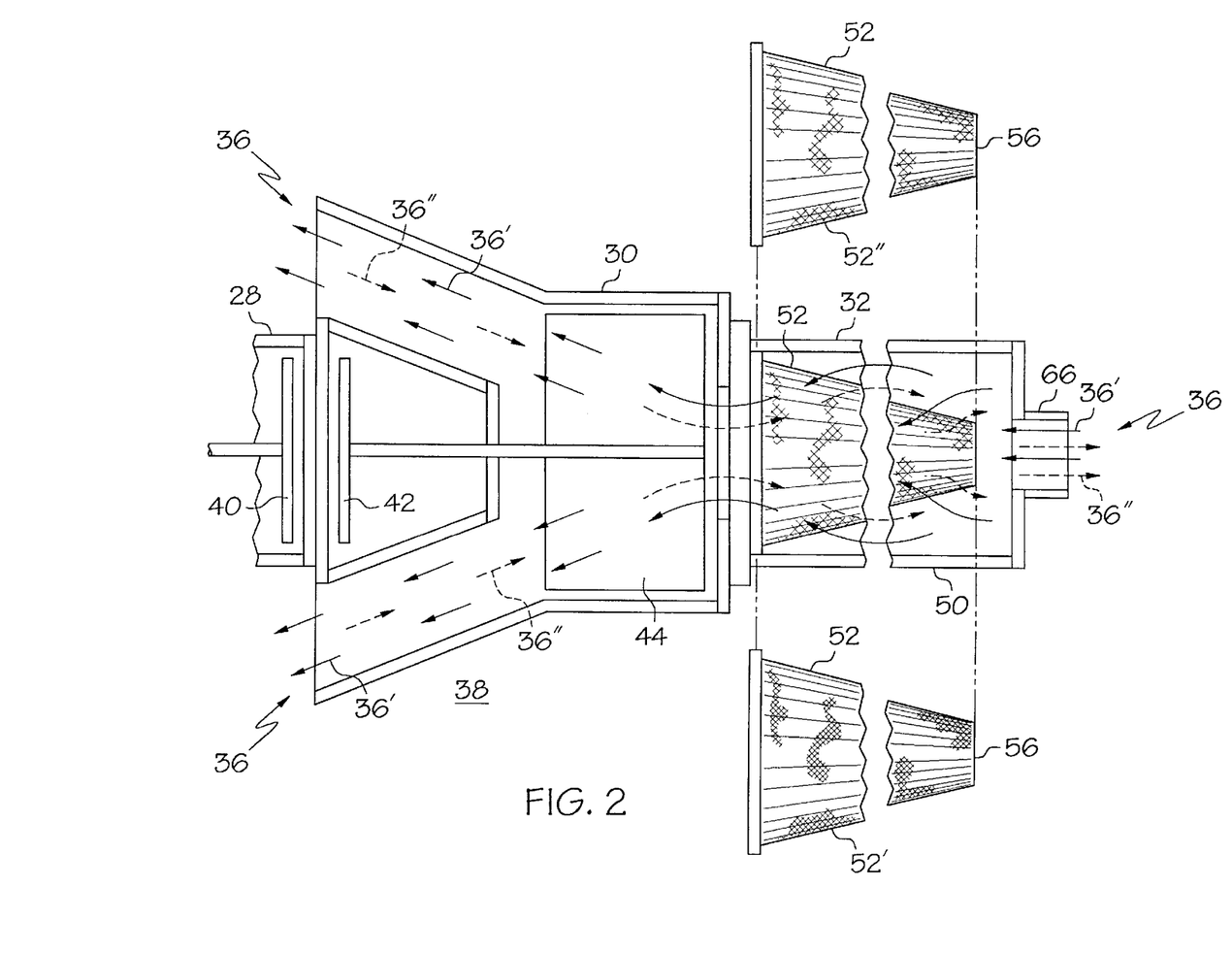
FIG. 2 depicts a cutaway view of a portion of the system of FIG. 1 demonstrating a coupling of a motor and a pump thereof, and demonstration a flow of liquid through a filtration unit and a pump thereof in accordance with a preferred embodiment of the present invention.

FIG. 1 schematically depicts a partial side view of a system 20 for extraction of debris 22 from a tank 24 of potentially radioactive water 26 in a nuclear-powered energy-generation facility (not shown). FIG. 1 demonstrates the coupling of a motor 28, a pump 30, a filtration unit 32, and a control unit 34 of system 20 in accordance with a preferred embodiment of the present invention. FIG. 2 depicts a cutaway view of a portion of system 20 demonstrating a magnetic coupling of motor 28 and pump 30, and demonstration a flow 36 of water 26 (FIG. 1) through filtration unit 32 and pump 30 in accordance with a preferred embodiment of the present invention.

Those skilled in the art will appreciate that the coupling of motor 28 and pump 30 may be performed in the factory, i.e., motor 28 and pump 30 may be an integrated unit. The use of such an integrated unit does not depart from the spirit of the present invention. Furthermore, it should be understood that, for purposes of this discussion, any coupling action is continuous until definitively uncoupled. That is, once motor 28 and pump 30 have been coupled together, they remain coupled together unless specifically uncoupled.

Debris-extraction system 20 consists of a subaqueous (i.e., fully submersible) vacuum unit 38 and a control unit 34 with which to control the operation of vacuum unit 38 from outside tank 24. Control unit 34 is not intended to enter water 26.

Vacuum unit 38 consists of subaqueous motor 28, subaqueous pump 30, and subaqueous filtration unit 32. In the preferred embodiment, motor 28 is magnetically coupled to pump 30 (FIG. 2). That is, motor 28 incorporates a magnetic coupler 40 that is magnetically locked to another magnetic coupler 42 in pump 30. Magnetic coupler 42 of pump 30 is typically formed as a part of an impeller 44. Magnetic coupling is desirable as a shaft (not shown) between motor 28 and pump 30 is thereby eliminated, as is a shaft seal (not shown). Such a seal may be damaged or corrupted by radiation in water 26 or may tend to collect debris 22. Those skilled in the art will appreciate magnetic coupling also provides an advantage where system 20 is used with tanks 24 of other liquids 26 whose nature may corrode or otherwise damage a shaft seal. With an appropriate radiation-resistant and/or corrosion-resistant seal, or in applications where radiation and/or corrosion is not a problem, a coupling shaft between motor 28 and pump 30 may be feasible. The use of such a coupling shaft does not depart from the spirit of the present invention.

In the preferred embodiment, motor 28 is a reversible, variable-speed motor 28. Control unit 34 determines a speed and a rotational direction of motor 28, and thereby determines the rate and direction of flow 36 of water 26 through pump 30. When control unit 34 causes motor 28 to rotate in a forward rotational direction, it also causes pump 30 to produce a forward flow 36' of water 26. Forward flow 36' passes through first through filtration unit 32, then through pump 30. Similarly, when control unit 34 causes motor 28 to rotate in a reverse rotational direction, it also causes pump 30 to produce a reverse flow 36" of water 26. Reverse flow 36" passes first through pump 30, then through filtration unit 32.

Filtration unit 32 is removably coupled to pump 30 (FIG. 1). Debris 22 collected within filtration unit 32 is potentially radioactive. Therefore, it is desirable that filtration unit 32 is coupled to pump 30 by a mechanism that permits filtration unit 32 to be decoupled from pump 30 while remaining completely under water 26, which water 26 serves as a radiation shield. In the preferred embodiment, filtration unit 32 is coupled to pump 30 via a dog 46 and a cam lock 48, the design and construction of which may be conventional. Those skilled in the art will appreciate that other coupling mechanisms may be used without departing from the spirit of the present invention.

Filtration unit 32 is made up of a filter housing 50 and a filter 52 (FIG. 2). Filter 52 is removably incorporated into filter housing 50, thereby permitting a fine filter 52' to be used when debris 22 is formed of micro-objects 54' (i.e., sediment or very small objects of a first predetermined size (not shown)), and a coarser filter 52" to be used when debris 22 is formed of macro objects 54" (i.e., dropped items or other visible objects of a second predetermined size (not shown) larger than the first predetermined size). Those skilled in the art will appreciate that, when filter #52 is incorporated into filter housing 50, it remains continuously so incorporated until specifically unincorporated.

In the preferred embodiment, filter 52 uses a substantially metallic filter element 56. Element 56 is desirably fabricated of a metal mesh (e.g., stainless steel) of an appropriate weave. Element 56 is preferably metallic as other materials (e.g., fiberglass) may tend to deteriorated much more rapidly in the presence of radiation. Those skilled in the art will appreciate, however, that other types of elements 56 may be used for filter 52 without departing from the spirit of the present invention. For example, when liquid 26 is other than water.

Substantially all of flow 36 passing through pump 30 also passes through filtration unit 32 (FIG. 2). Similarly, substantially all of flow 36 passing through filtration unit 32 passes through filter 52. That is, filter 52 preferably fits sufficiently snugly into filter housing 50 so that there is substantially no part of flow 36 bypassing filter 52 through gaps or holes in the juncture between filter 52 and filter housing 50. This inhibits the bypassing of filter 52 by any potentially radioactive object 54 of debris 22. Were a portion of flow 36 to bypass filter 52, then objects 54 of debris 22, especially micro objects 54', would tend to collect within filter housing 50 and pump 30. In the preferred embodiment, where objects 54 tend to be radioactive, pump 30 and filter housing 50 would eventually become radioactive or otherwise contaminated in turn, potentially too radioactive for human handling. Passing substantially all of flow 36 through filter 52 indefinitely extends the service life of pump 30 and filter housing 50.

Figure 3:
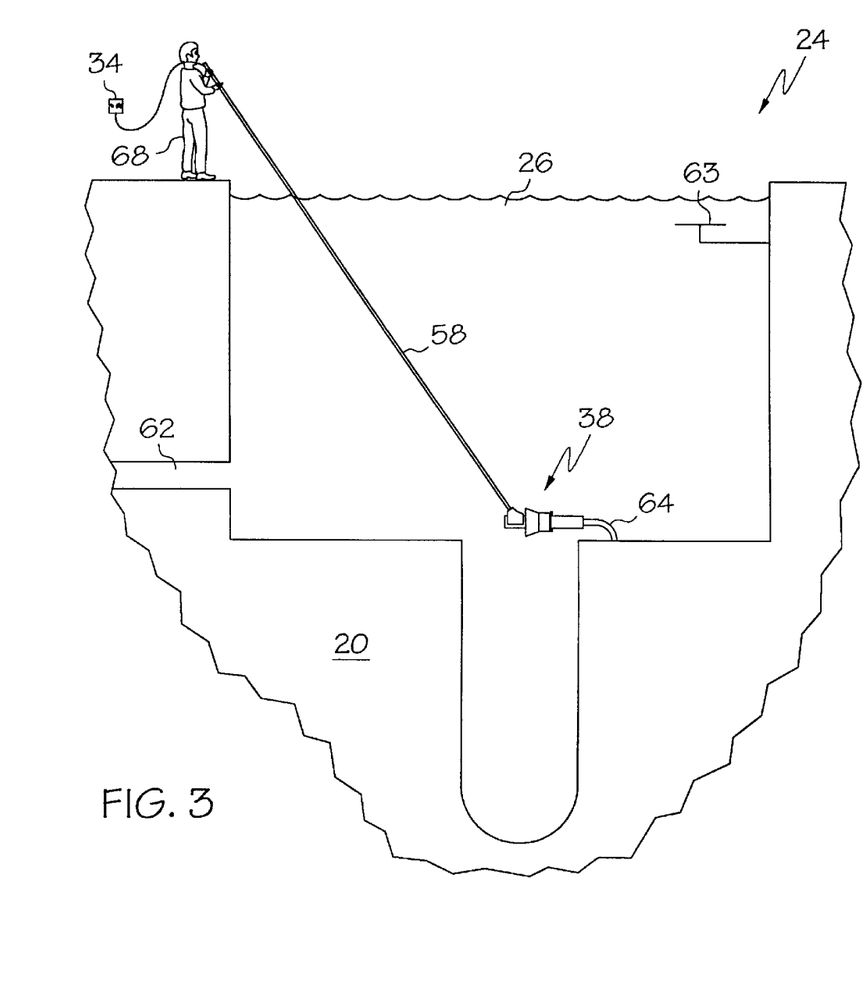
FIG. 3 depicts the system of FIG. 1 being used to extract debris from a tank of liquid utilizing a rigid pole in accordance with an alternative preferred embodiment of the present invention.
Figure 4:
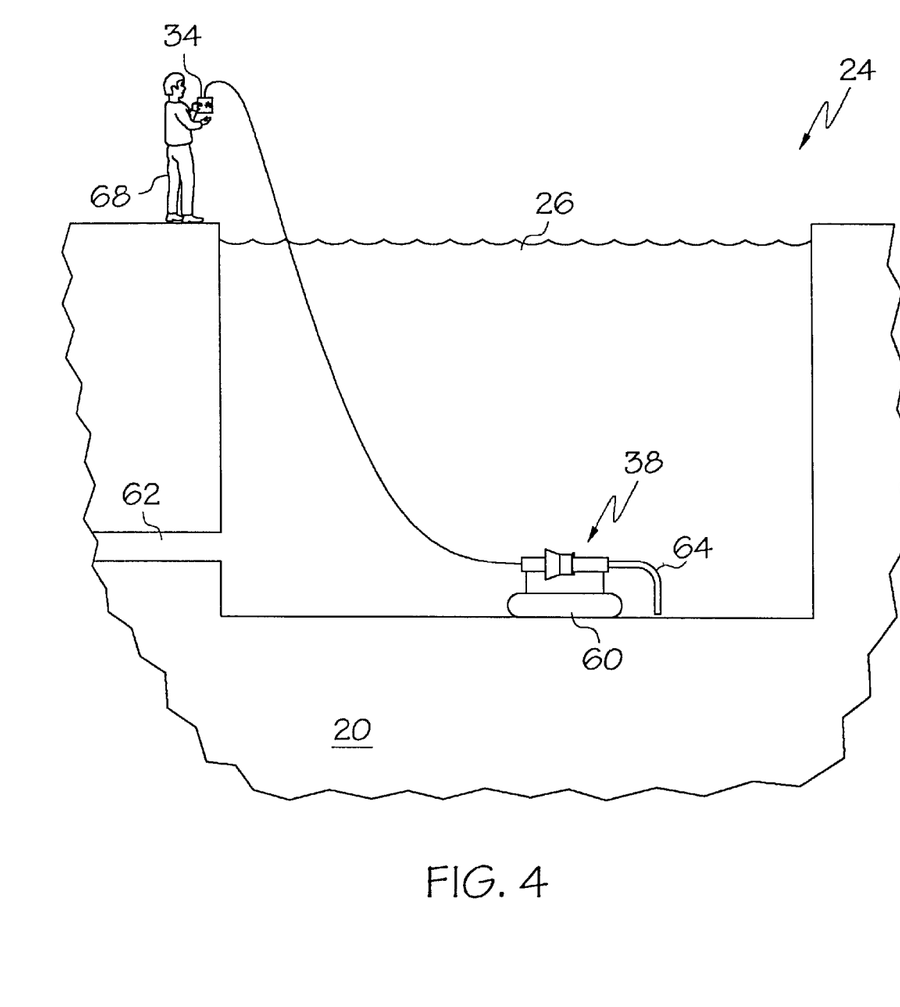
FIG. 4 depicts the system of FIG. 1 being used to extract debris from a tank of liquid utilizing a remote-controlled positioning unit in accordance with an alternative preferred embodiment of the present invention.
Figure 5:
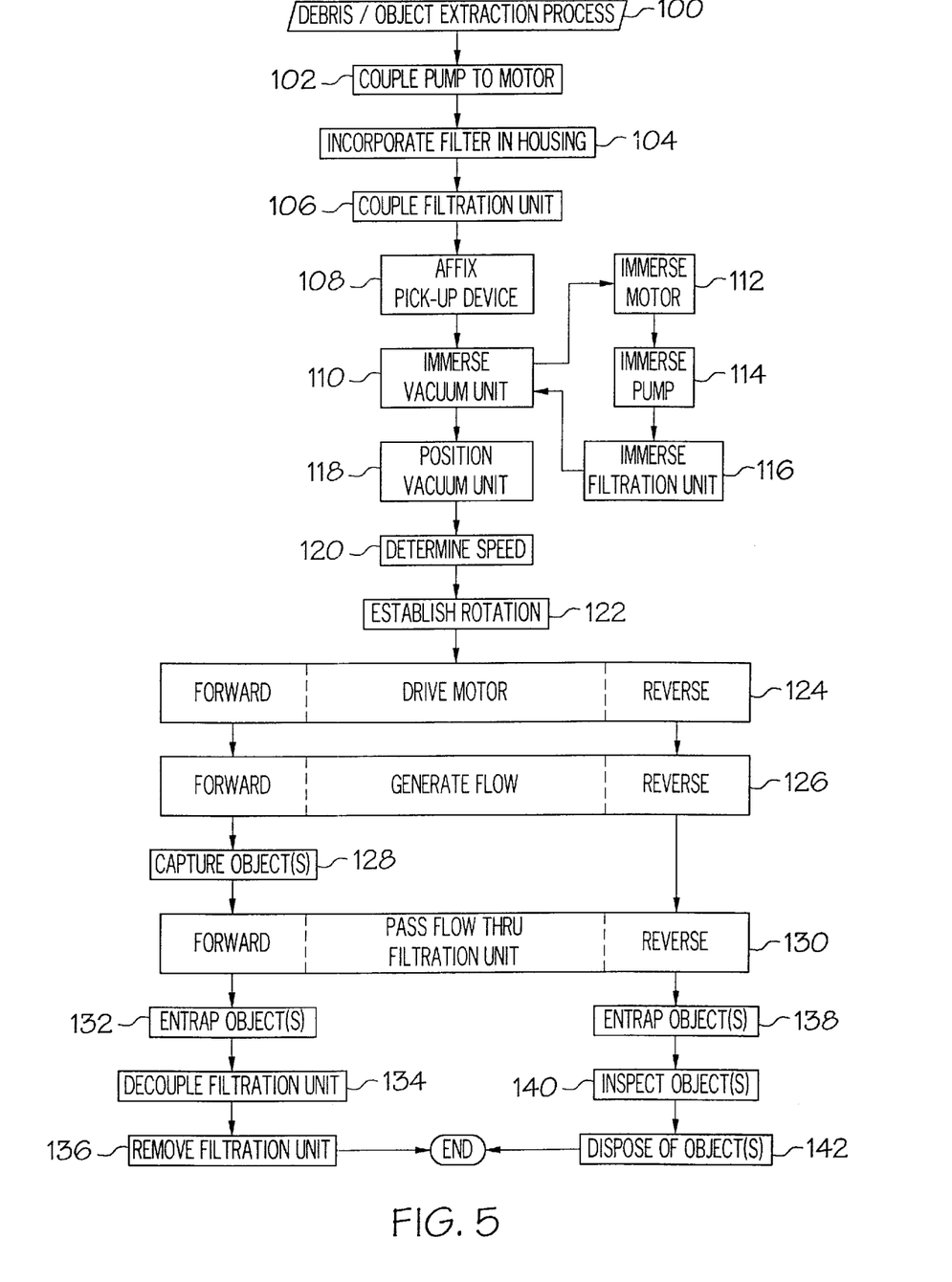
FIG. 5 depicts a flow chart of a debris-extraction process utilizing the system of FIG. 1 in accordance with a preferred embodiment of the present invention.
Figure 6:
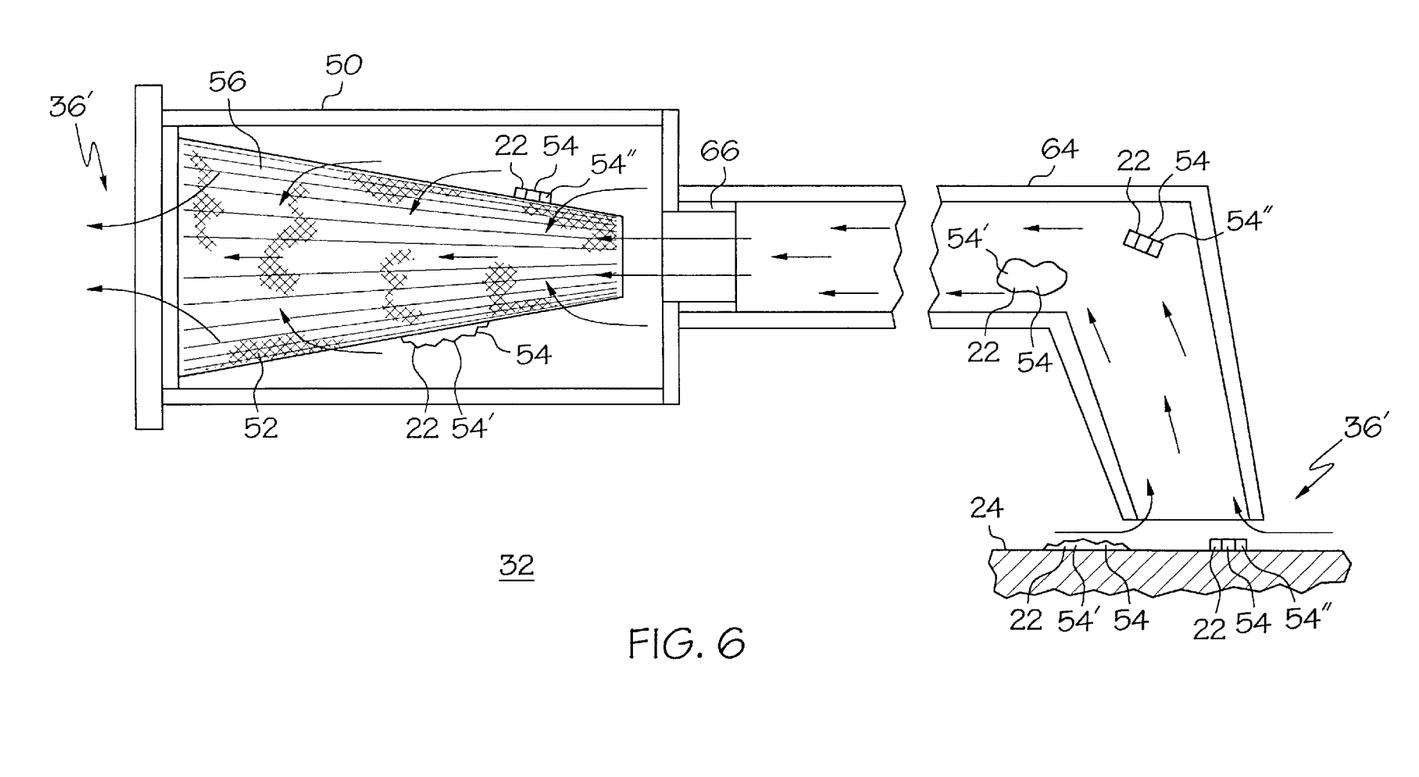
FIG. 6 depicts a filtration unit of the system of FIG. 1 sustaining a forward flow of liquid so as to capture and entrap an object of debris in a filter incorporated within the filtration unit in accordance with a preferred embodiment of the present invention.
Figure 7:
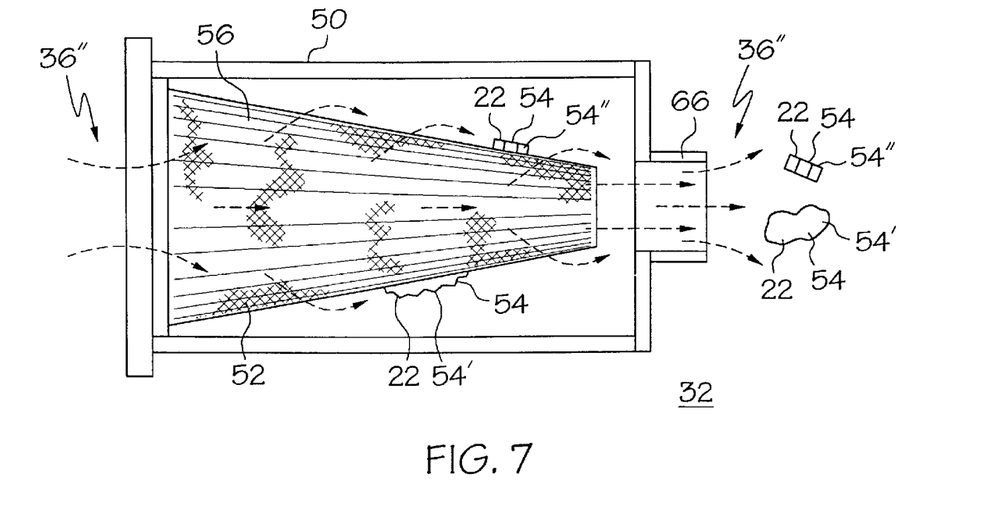
FIG. 7 depicts a filtration unit of the system of FIG. 1 sustaining a reverse flow of liquid so as to extract an entrapped object of debris from a filter incorporated within the filtration unit in accordance with a preferred embodiment of the present invention.
Figure 8:
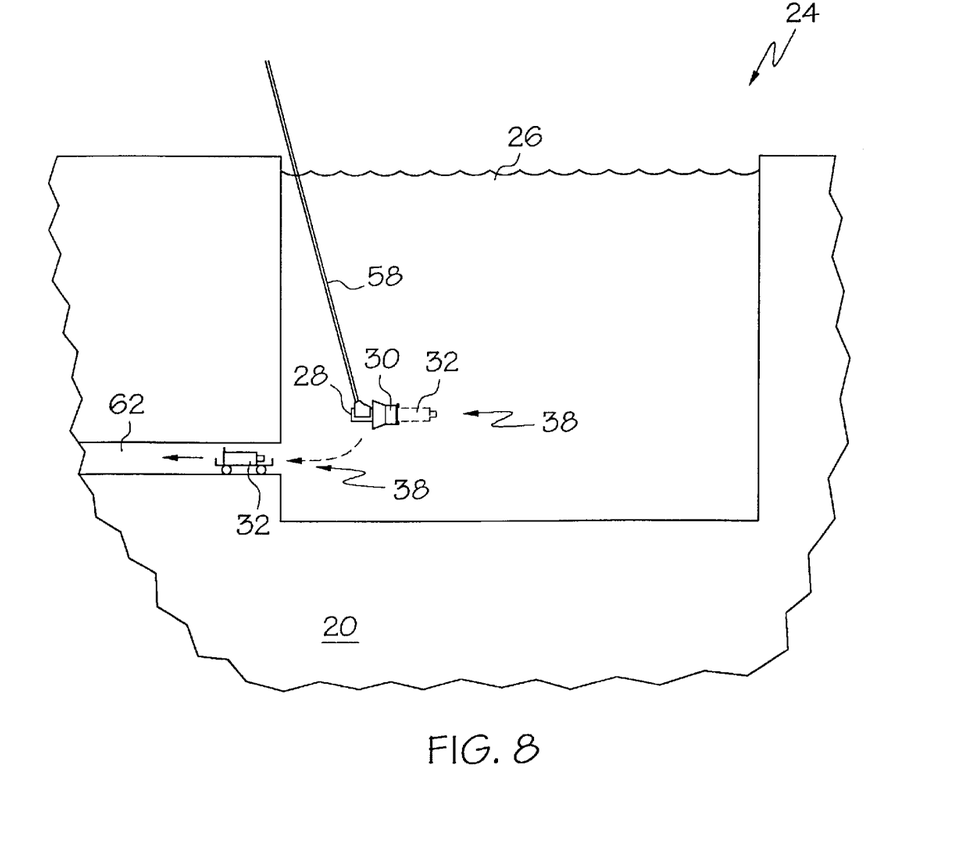
FIG. 8 depicts a filtration unit of the system of FIG. 1 being removed from a tank of liquid via a transfer canal in accordance with a preferred embodiment of the present invention.

FIGS. 3 and 4 depict system 20 being used to extract debris 22 from tank 24 of water 26 utilizing a rigid pole 58 (FIG. 3) and a remote-controlled positioning unit 60 (FIG. 4), while FIG. 5 depicts a flow chart of a debris-extraction process 100 utilizing system 20 in accordance with a preferred embodiment of the present invention. FIGS. 6 and 7 depict filtration unit 32 sustaining forward flow 36' (FIG. 6) and reverse flow 36" (FIG. 7) so as to capture and entrap debris 22 in filter 52 (FIG. 6) and to extract an entrapped object (54) of debris (22) from filter 52 (FIG. 7) in accordance with a preferred embodiment of the present invention. FIG. 8 depicts filtration unit 32 being removed from tank 24 via a transfer canal 62 in accordance with a preferred embodiment of the present invention. The following discussion refers to FIGS. 1 through 8.

The execution of process 100 to extract object 54 of debris 22 from tank 24 of water (or other liquid) 26 proceeds through a series of discrete tasks. In a task 102 pump 30 is magnetically coupled to motor 28 (FIG. 2). Typically, pump 30 and motor 28 are an integral unit, i.e., are initially pre-coupled at the factory, which coupling continues throughout the service life of pump 30 and motor 28. Those skilled in the art will appreciate that such pre-coupling is not a requirement of the present invention, and that discrete pump 30 and motor 28 may be used without departing from the spirit of the present invention.

In a task 104, filter 52 is incorporated into filter housing 50 of filtration unit 32. In a task 106 filtration unit 32 is removably coupled to pump 30. As previously discussed, filtration unit 32 is coupled to pump 30 in such a manner as to be easily decoupled while remaining completely submerged. For example, vacuum unit may be placed upon an inspection table 63 (FIG. 3), while remaining submerged within liquid 26, and cam 48 (FIG. 1) manipulated by tongs or grippers (not shown) to decouple filtration unit 32.

In a task 108, a pick-up device 64 is affixed to an intake 66 of filtration unit 32 (FIG. 6). Pick-up device 64 is a tube or nozzle used to direct debris 22 into filtration unit 32 of vacuum unit 38. Any number of pick-up devices 64, each having a different shape and/or size, may be individually affixed to filtration unit 32 to suit individual circumstances. FIG. 6 depicts a general-purpose pick-up device 64 similar in shape and function to the nozzle used on a conventional swimming-pool vacuum.

In a task 110, vacuum unit 38 is immersed into tank 24 (FIGS. 3 and 4). That is, subtasks 112, 114, and 116 substantially simultaneously immerse motor 28, pump 30, and filtration unit 32 into tank 24. Those skilled in the art will appreciate that, depending upon the specific connective embodiment of motor 28, pump 30, and filtration unit 32, and also depending upon the angle at which vacuum unit 38 is immersed into tank 24, one or another of motor 28, pump 30, and filtration unit 32 may be immersed firstly, centrally, or lastly. The order in which motor 28, pump 30, and filtration unit 32 are immersed, i.e., the order in which tasks 112, 114, and 116 are executed, is irrelevant to the spirit of the present invention.

In a task 118, vacuum unit 38 is positioned within tank 24. Task 118 is ongoing for the greater part of process 100. Task 118 is typically executed under the control of an operator 68 from outside of tank 24.

In the preferred embodiment (FIG. 3), operator 68 utilizes rigid pole 58 to manually effect task 118 while remaining outside of tank 24. As tank 24 may be deep (e.g., in excess of 50 feet), pole 58 may be long (e.g., in excess of 60 feet). Because of the potential pole length, vacuum unit should be as light as possible. Ideally, vacuum unit 38 has a mass less than 50 pounds, thereby precluding the use of bulky water-filled hoses, etc.

A buoyancy unit 70 (FIG. 1) may be used to offset or partially offset the mass of vacuum unit 38 when submerged. Buoyancy unit 70 may be a hollow portion of rigid pole 58 proximate vacuum unit 38, or may in fact be a portion of vacuum unit 38 itself. Those skilled in the art will appreciate that the use of buoyancy unit 70 is not a requirement of, and does not depart from the spirit of the present invention.

In an alternative embodiment (FIG. 4), operator 68 uses positioning unit 60, remotely controlled via control unit 34, to effect task 118. Those skilled in the art will appreciate that other techniques may be used to position and control vacuum unit 38 while submersed in tank 24. The use of alternative techniques does not depart from the spirit of the present invention. Additionally, it will be realized that auxiliary devices (not shown), such as cameras, may be attached to vacuum unit 38 and used to assist operator 68 in effecting task 118. The use of such auxiliary devices is also within the spirit of the present invention.

In a task 120, control unit 34 establishes a speed for motor 28. Desirably, the speed of variable-speed motor 28 is established as the lowest speed sufficient to perform the task, i.e., to vacuum up or extract the specific debris 22. The use of a lower speed achieves minimal disturbance of surrounding water (or other liquid) 26 and debris 22 which may be suspended therein. The desirable capabilities of motor 28, under the control of control unit 34, are such that a maximum forward and reverse rotational speeds of motor 28 causes pump 30 to generate forward and reverse flows 36' and 36" in excess of 150 and 75 gallons per minute, respectively. In the preferred embodiment, these flows are typically 200 and 125 gallons per minute. These flow rates allow vacuum unit 38 to capture macro objects 54" of debris 22 having greater mass and/or at greater distances from pick-up device 64 in comparison to prior-art vacuum systems.

In a task 120, control unit 34 determines a rotational direction (not shown) for motor 28. When vacuum unit 38 is to be used to capture and entrap object(s) 54 of debris 22 in filter 52, control unit 34 sets motor 28 to operate in a forward rotational direction (not shown). Conversely, when vacuum unit 38 is to be used to extract entrapped object(s) 54 of debris 22 from filter 52, control unit 34 sets motor 28 to operate in a reverse rotational direction (not shown).

When task 122 has established that motor 28 is to have a forward rotational direction (FIG. 6), then in a task 124 motor 28 is driven in a forward rotational direction. Since pump 30 is magnetically coupled to motor 28, pump 30 is also driven in a forward rotational direction by task 124.

In a task 126, pump 30 generates a flow 36 of water (or other liquid) 26. When task 124 drives motor 28 in a forward rotation direction, pump 30 generates forward flow 36', which passes through pick-up device 64, filtration unit 32, and pump 30, respectively. Conversely, when task 124 drives motor 28 in a reverse rotational direction, pump 30 generates reverse flow 36", which passes through pump 30, filtration unit 32, and (if affixed) pick-up device 64, respectively.

When pump 30 generates forward flow 36', a task 128 captures object(s) 54 of debris 22 in forward flow 36' via pick-up device 64.

Following task 128, in a task 130, forward flow 36' is passed through pick-up device 64, filtration unit 32, and pump 30, respectively. Filter 52 is incorporated into filter housing 50 so that substantially all of forward flow 36' passes through filter 52 (FIG. 6). In a task 132, object(s) 54 are entrapped in and by filter 52 while forward flow 36' is passing through filter 52.

Alternative techniques for removing and disposing of entrapped object(s) 54 are considered herein. Those skilled in the art will appreciate that these techniques are not exhaustive, and that the use of other techniques does not violate the spirit of the present invention.

In a first disposal technique, in an optional task 134, filtration unit 32 is decoupled from pump 132 while vacuum unit 38 remains completely submersed. In a task 136, filtration unit 32 or, if filtration unit 32 was not decoupled from pump 30, the whole of vacuum unit 38 (after breaking the electrical connection with control unit 34) is removed from tank 24. In a typical nuclear facility, containment tank 24 has subaqueous transfer canal 62 primarily intended to allow removal of nuclear fuel elements (not shown) to be removed from tank 24 as a part of the refueling process (not discussed herein). Transfer canal 62 has predetermined inner dimensions (not shown) sufficient for its intended purpose. Vacuum unit 38 is made with predetermined outer dimensions (not shown) sufficient to allow the passage of vacuum unit 38 through transfer canal 62 to effect removal from tank 24. Since vacuum unit may be removed via transfer canal 62, a portion of vacuum unit 38, i.e., filtration unit 32, may also be so removed (FIG. 8). Filter removal is therefore rapid, with the elimination of the time (and safety risks) involved in the use of a conventional shielded filter removal cask. The entire refueling process is therefor significantly reduced in time, which realizes a corresponding reduction in costs.

In some facilities, filtration unit 32 may be removed from tank 24 via a transport device (not shown). Filtration unit 32 is dimensioned to allow removal from tank 24 via the transport device.

In an alternative disposal technique, in task 120, control unit 34 determines motor 28 is to have a reverse rotational direction (not shown). Then, in task 124, motor 28 is driven in a reverse rotational direction (FIG. 7). Since pump 30 is magnetically coupled to motor 28, pump 30 is also driven in a reverse rotational direction. In task 126, pump 30 generates reverse flow 36" of water (or other liquid) 26. In task 130, reverse flow 36" is passed through pump 30, filtration unit 32, and (if affixed) pick-up device 64, respectively. As with forward flow 36', substantially all of reverse flow 36" passes through filter 52.

In a task 138, object(s) 54 are extracted from filter 52 while reverse flow 36" is passing through filter 52. Extracted object(s) leave filter 52 via intake 66, now acting as an output.

In an optional task 140, object(s) 54 extracted from filtration unit 32, i.e., from filter 52, may be cast upon a subaqueous inspection tray or table 63 (FIG. 3). In the case of macro-object(s) 54, such inspection may be required by regulation. After inspection, object(s) 54 may be recaptured from the inspection tray of table 63.

The ability to extract and disgorge entrapped macro object 54" results in a significant reduction in the time required to retrieve and inspect a foreign object 54. This results in a corresponding reduction in down time and related costs.

Finally, in a task 142, object(s) 54 extracted from filtration unit 32 may be cast into a disposal vessel (not shown) or otherwise disposed of.

Certain accessories and adapters (not shown) may be used with system 20, such as stabilizing fins, cameras, sonar navigational aids, etc. Such devices may allow finer control of the navigation of vacuum unit 38 around tank 24. Those skilled in the art will appreciate that the use of any such accessories does not depart from the spirit of the present invention.

In summary, a liquid-tank debris-extraction system 20 and method 100 of operation thereof are disclosed. A submersible vacuum unit 38 is used to extract object(s) 54 of debris 22 from a tank 24 of water or other liquid 26. A reversible and variable-speed motor 28 is used within the vacuum unit 38. A removable coupling couples filtration unit 32 to pump 30, wherein filtration unit 32 may be decoupled from pump 30 while completely submerged. Within filtration unit 32, a forward flow 36' of water or other liquid 26 entraps object(s) 54 of debris 22 in a filter 52 incorporated therein. In addition, a reverse flow 36" of water or other liquid 26 extracts object(s) 54 of debris 22 entrapped in filter 52. Vacuum unit 38 may be navigated within tank 24 by an operator 68 located outside of tank 24 via a rigid pole 58.

While the present invention is aimed primarily at overcoming the cleaning problems of a tank of potentially radioactive water in a nuclear-powered energy-generation facility, those skilled in the art will appreciate that the present invention may also be applied to the cleaning of tanks or pools of other liquids hazardous to humans.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A system for extraction of debris from a liquid, said system comprising:
    a reversible motor, said motor being a first part of a submersible vacuum unit configured to be completely submersed in said liquid;
    a pump coupled to said motor, said pump being a second part of said submersible vacuum unit;
    a filtration unit removably coupled to said pump and incorporating a filter configured to entrap said debris, said filtration unit being a third part of said submersible vacuum unit; and
    a control unit electrically coupled to said motor and configured to determine a rotational direction of said motor from outside said liquid, wherein said pump passes a portion of said liquid through said filtration unit as a forward flow when said control unit causes said motor to operate in a forward rotational direction, and wherein said pump passes a portion of said liquid through said filtration unit as a reverse flow when said control unit causes said motor to operate in a reverse rotational direction.

2. A debris-extraction system as claimed in claim 1 wherein said pump comprises an impeller magnetically coupled to said motor.

3. A debris-extraction system as claimed in claim 1 wherein said motor is a variable-speed motor having a speed controlled by said control unit.

4. A debris-extraction system as claimed in claim 3 wherein said forward flow exceeds 150 gallons per minute when said control unit causes said motor to operate at a maximum speed in said forward rotational direction.

5. A debris-extraction system as claimed in claim 3 wherein said reverse flow exceeds 75 gallons per minute when said control unit causes said motor to operate at a maximum speed in said reverse rotational direction.

6. A debris-extraction system as claimed in claim 1 wherein said filter is incorporated into said filtration unit so that substantially all of said forward flow passes through said filter.

7. A debris-extraction system as claimed in claim 1 wherein an object of said debris entrapped in said filter is extracted from said filter by said reverse flow.

8. A debris-extraction system as claimed in claim 1 additionally comprising a substantially rigid pole coupled to said vacuum unit and configured to enable an operator outside of said liquid to manually position said vacuum unit within said liquid.

9. A debris-extraction system as claimed in claim 8 wherein said substantially rigid pole comprises a buoyancy unit configured to offset at least part of a mass of said vacuum unit when said vacuum unit is submerged in said liquid.

10. A debris-extraction system as claimed in claim 1 additionally comprising a buoyancy unit configured to offset at least part of a mass of said vacuum unit when said vacuum unit is submerged in said liquid.

11. A debris-extraction system as claimed in claim 1 additionally comprising a positioning unit coupled to said vacuum unit, electrically coupled to said control unit, and configured to enable an operator outside of said liquid to utilize said control unit to maneuver said vacuum unit within said liquid.

12. A debris-extraction system as claimed in claim 1 additionally comprising a pick-up device coupled to an input of said filtration unit and configured to capture an object of said debris.

13. A debris-extraction system as claimed in claim 1 configured to extract said debris when said liquid is potentially radioactive water in a nuclear-powered energy-generation facility.

14. A system for extraction of debris from a tank of potentially radioactive water in a nuclear-powered energy-generation facility, said system comprising:
    a subaqueous reversible motor;
    a subaqueous pump coupled to said motor;
    a subaqueous filter housing removably coupled to said pump;
    a filter contained within said filter housing and configured to entrap an object of said debris; and
    a control unit electrically coupled to said motor and configured to determine a rotational direction of said motor from outside said tank, wherein said pump produces a forward flow of said water when said control unit causes said motor to operate in a forward rotational direction, and wherein said pump produces a reverse flow of said water when said control unit causes said motor to operate in a reverse rotational direction.

15. A debris-extraction system as claimed in claim 14 wherein said pump comprises an impeller magnetically coupled to said motor.

16. A debris-extraction system as claimed in claim 14 wherein:
said forward flow passes through said filter housing; and
said filter is incorporated into said filter housing so that substantially all of said forward flow passes through said filter.

17. A debris-extraction system as claimed in claim 14 wherein said filter comprises a substantially metallic filter element.

18. A debris-extraction system as claimed in claim 14 wherein: said filter is configured to entrap an object larger than a predetermined size.

19. A debris-extraction system as claimed in claim 14 wherein:
said filter is configured so that said object is entrapped in said filter by said forward flow; and
said filter is further configured so that said entrapped object is extracted from said filter by said reverse flow.

20. A debris-extraction system as claimed in claim 14 wherein:
said tank comprises a subaqueous transfer canal; and
said filter housing is dimensioned to pass through said transfer canal.

21. A debris-extraction system as claimed in claim 20 wherein said filter housing, said pump, and said motor are together dimensioned to pass through said transfer canal.

22. A debris-extraction system as claimed in claim 14 wherein:
said nuclear-powered energy-generation facility has a subaqueous transport device for removal of nuclear fuel elements from said tank; and
said filter housing is configured to be removed from said tank utilizing said subaqueous transport device.

23. A method of extracting debris from a liquid, said method comprising the following activities:
coupling a pump of a vacuum unit to a reversible motor thereof;
immersing said vacuum unit into said liquid;
driving said motor of said vacuum unit in one of a forward rotational direction and a reverse rotational direction via a control unit, wherein said control unit is outside of said liquid;
generating a flow of said liquid through said pump, wherein said flow is one of a forward flow and a reverse flow, respectively; and
passing said flow through a filtration unit of said vacuum unit.

24. A debris-extraction method as claimed in claim 23 wherein:
said driving activity drives said motor in said forward rotational direction;
said generating activity generates said forward flow; and
said method additionally comprises entrapping said debris in said filtration unit.

25. A debris-extraction method as claimed in claim 24 wherein said passing activity passes substantially all of said forward flow through a filter incorporated into said filtration unit.

26. A debris-extraction method as claimed in claim 24 additionally comprising removing said debris entrapped in said filtration unit during said entrapping activity from said liquid while entrapped within said filtration unit.

27. A debris-extraction method as claimed in claim 24 wherein:
said driving activity drives said motor in said reverse rotational direction;
said generating activity generates said reverse flow; and
said method additionally comprises extracting from said filtration unit via said reverse flow said debris entrapped therein during said entrapping activity.

28. A debris-extraction method as claimed in claim 27 additionally comprising:
inspecting said debris; and
disposing of said debris.

29. A debris-extraction method as claimed in claim 23 additionally comprising:
establishing a rotational direction of said motor via said control unit; and
determining a rotational speed of said motor via said control unit.

30. A debris-extraction method as claimed in claim 23 additionally comprising manually positioning said vacuum unit within said liquid from outside of said liquid.

31. A debris-extraction method as claimed in claim 23 wherein:
said method additionally comprises affixing a pick-up device to said filtration unit;
said driving activity drives said motor in said forward rotational direction;
said generating activity generates said forward flow;
said method additionally comprises capturing said debris via said pick-up device; and
said passing activity passes said forward flow containing said debris through said pick-up device.

32. A debris-extraction method as claimed in claim 23 wherein said coupling activity magnetically couples said pump to said motor within said vacuum unit.

33. A method of extracting an object of debris from a tank of potentially radioactive water in a nuclear-powered energy-generation facility, said method comprising the following activities:
incorporating a filter within a filter housing;
immersing a reversible motor into said tank;
immersing a pump into said tank, wherein said pump is coupled to said motor;
immersing said filter housing into said tank, wherein said filter housing is removably coupled to said pump;
driving said motor and said pump in one of a forward and a reverse rotational direction via a control unit to generate one of a forward and a reverse flow, respectively, of said water, wherein said control unit is outside of said tank; and
passing said one flow of said water through said pump, said filter housing, and said filter.

34. A object-extraction method as claimed in claim 33 wherein:
said driving activity drives said motor and said pump in said forward rotational direction; and
said passing activity passes substantially all of said forward flow through said filter.

35. A object-extraction method as claimed in claim 33 wherein:
said driving activity drives said motor and said pump in said forward rotational direction;
said method additionally comprises capturing said object in said forward flow; and
said method additionally comprises entrapping said captured object by said filter.

36. An object-extraction method as claimed in claim 35 wherein:
said method additionally comprises affixing a pick-up device to said filter housing; and
said capturing activity captures said object via said pick-up device.

37. An object-extraction method as claimed in claim 35 additionally comprising decoupling said filter housing from said pump within said tank.

38. An object-extraction method as claimed in claim 35 additionally comprising removing said filter housing, said filter, and said entrapped object from said tank while said entrapped object is entrapped by said filter.

39. An object-extraction method as claimed in claim 38 wherein said removing activity removes said filter housing, said filter, and said entrapped object from said tank through a subaqueous transfer canal.

40. An object-extraction method as claimed in claim 35 wherein:
said driving activity drives said motor and said pump in said reverse rotational direction;
said method additionally comprises extracting from said filter via said reverse flow said object entrapped thereby during said entrapping activity;
said method additionally comprises inspecting said object extracted from said filter by said extracting activity.

41. A debris-extraction method as claimed in claim 33 additionally comprising manually positioning said motor, said pump, and said filter housing within said tank from outside of said tank.

* * * * *